United States Patent
Li et al.

(10) Patent No.: US 8,913,824 B2
(45) Date of Patent: Dec. 16, 2014

(54) COLOR PIXEL COUNTING FOR TIERED BILLING IN OUTPUT JOBS

(71) Applicant: Xerox Corporation, Norwalk, CT (US)

(72) Inventors: Xing Li, Webster, NY (US); Amal Malik, Pittsford, NY (US); Clara Cuciurean-Zapan, Fairport, NY (US)

(73) Assignee: Xerox Corporation, Norwalk, CT (US)

(*) Notice: Subject to any disclaimer, the term of this patent is extended or adjusted under 35 U.S.C. 154(b) by 114 days.

(21) Appl. No.: 13/680,275

(22) Filed: Nov. 19, 2012

(65) Prior Publication Data
US 2014/0140614 A1    May 22, 2014

(51) Int. Cl.
G06K 9/00     (2006.01)
G06Q 30/04    (2012.01)
H04N 1/00     (2006.01)
H04N 1/34     (2006.01)

(52) U.S. Cl.
CPC ............ *G06Q 30/04* (2013.01); *G06K 9/00442* (2013.01); *H04N 1/00005* (2013.01); *H04N 1/00068* (2013.01); *H04N 1/342* (2013.01)
USPC .......................................................... 382/165

(58) Field of Classification Search
None
See application file for complete search history.

(56) References Cited

U.S. PATENT DOCUMENTS

| | | | |
|---|---|---|---|
| 2003/0206307 A1* | 11/2003 | Handley et al. ................ | 358/1.9 |
| 2009/0195799 A1* | 8/2009 | Malik et al. .................... | 358/1.9 |
| 2010/0088201 A1 | 4/2010 | Nagarajan et al. | |
| 2010/0100505 A1 | 4/2010 | Campbell et al. | |
| 2010/0280929 A1* | 11/2010 | Coffey et al. ................... | 705/34 |
| 2012/0143736 A1 | 6/2012 | Li | |
| 2013/0066756 A1* | 3/2013 | Malik et al. ..................... | 705/34 |

* cited by examiner

*Primary Examiner* — Li Liu
(74) *Attorney, Agent, or Firm* — Pillsbury Winthrop Shaw Pittman, LLP

(57) ABSTRACT

A processor-implemented method for processing image data of a document using an apparatus or medium. The processor determines a billable color pixel count in an image by determining a first count of color pixels in the image data in device independent space (e.g., fuzzy and true color counts using a neutral page determination) and a second count of color pixels in device dependent space (e.g., binary CMYK based count). The first and second counts are transformed and a minimum of the transformation is used as the billable count. Based on the disclosed implementation, billing accuracy for outputting color documents is improved and flexibility in tier-based billing is preserved.

17 Claims, 3 Drawing Sheets

COLOR PIXEL COUNTING FOR TIERED BILLING IN OUTPUT JOBS

BACKGROUND

1. Field

The present disclosure is generally related to determining billing based on color pixels in image data.

2. Description of Related Art

Image data comprises a number of pixels having a number of components that contribute to defining the image, such as color and intensity. The image data generally includes various color or gray levels, which contribute to the intensity of each pixel in the image. Each pixel of the image is assigned a number representing the amount of light or gray level for a particular color space at that particular spot; i.e., the shade of gray in the pixel. Binary image data has two possible values for each pixel, black (represented by the number "1") or white (represented by the number "0"). Images that have a large range of shades are referred to as grayscale images. For example, grayscale images have an 8-bit value per pixel comprising 256 tones or shades of gray for each pixel in the image (gray level of 0 to 255). Grayscale image data may also be referred to as continuous tone or contone image data. The pixels in a color image may be defined in terms of a color space, typically with three values, such as RGB—R for red, G for green, and B for blue—or four values, such as CMYK—C for cyan, M for magenta, Y for yellow, and K for black.

The pixels may also be defined in terms of device independent space (e.g., when inputting image data, such as standard RGB (sRGB) or CIE L*a*b) or a device dependent space (e.g., when outputting image data, such as RGB or CMYK). When outputting image data to an output device (e.g., copier, printer, or multi-function device (MFD)), a percentage scale may be used to identify how much ink is employed for a print or copy job. Such information may typically be used for billing a customer for print or copy jobs. For example, some methods employ a billing strategy based on an estimated amount of ink or toner consumption; others bill customers based on a print or copy mode selection (e.g., draft, standard, color, enhanced, etc.) of the output device. In dynamic print-job/copy-job environments, because printing documents using black ink or toner is less expensive than using colored ink or toner, billing is often based on the amount of color content contained in the job to be printed or copied. In order to bill customers for color printing or copying, color detection is an important feature required in an image path. Color detection is used to analyze documents for presence of color as well as an amount of color in order to bill customers accordingly. Generally, the higher the presence and amount of color in a document, the higher the cost.

Some systems include counting the number of color pixels in the image data of the document to be printed or copied. For example, a number of binary pixels associated with the CMYK color planes may be counted to determine a pixel count for each category of color at the time of marking (e.g., the time that ink(s) is/are used to mark a pixel on a page) for output in the image path. Generally, with existing color detection and counting methods, a pixel will be labeled as color when the presence of any one of the C, M, and Y signals is detected. U.S. application Ser. No. 12/252,391 (published as Patent Application No. 2010/0100505 A1 on Apr. 22, 2010), filed Oct. 16, 2008 by the same Assignee (Xerox Corporation), which is hereby incorporated by reference in its entirety, proposes a way to count color pixels. In solid ink and ink jet products, however, it is desirable to render neutral gray objects with CMYK ink. This could substantially decrease the appearance of graininess in large uniform gray areas, such as a gray fill or sweep. For billing purposes, it is not desirable to charge customer for color pixels that were (are) supposed to be gray and look gray to the human eye. The above-referenced '505 publication, for example, has limitations such as these (charging for color) in handling images that are converted to contone from rendered binary data.

In a typical multi-tier billing system for office as well as production printers or copiers, images are placed into different tiers based on the amount of color content on each page. Placing the image in the correct tier level is important both from the customer's, as well as the company's, perspective. Solid ink jet printer machines render neutral areas of an image with a combination of cyan, magenta, yellow, black (CMYK) toner/ink when printing or copying. This, however, creates problems in billing since these "gray" counts may be composed of color toners that mimic gray but may be counted towards color counts with known methods.

Some proposed solutions include methods such as disclosed in U.S. patent application Ser. No. 12/962,298, filed Dec. 7, 2010 and published as 2012/0143736 A1 on Jun. 7, 2012, and U.S. patent application Ser. No. 13/335,387, filed Dec. 22, 2011, both of which are assigned to the same assignee (Xerox Corporation) and both of which are hereby incorporated by reference in their entirety. The '298 application uses neutral pixel detection information obtained in Lab color space to control the counting of color pixels in rendered binary CMYK space. While the method disclosed in the '298 application can be effective in dealing with composite gray generated in the marking stage in solid inkjet systems, it is limited both in detection accuracy and in handling composite gray originals in the scanning process due to the relative small image processing context used in neutral pixel detection.

Also, the '387 application discloses a method of dividing the space formed by multiple color pixel counts into a number of regions and checking a set of conditions in each region to categorize the image data and use that categorization in determining the billing tier. One limitation with such a method is that, once the parameters are tuned for a particular billing tier/color area coverage relationship, they cannot be easily modified to handle requirements change without a new round of optimization.

Accordingly, an improved system and method of evaluating an image to determine an amount of color content in a document to use for billing customers is desirable.

SUMMARY

One aspect of the disclosure provides a processor-implemented method for processing image data using an image processing apparatus having at least one processor for processing documents containing image data including a plurality of pixels. The method includes the following acts implemented by the at least one processor:

receiving image data of a document including a plurality of pixels;

determining a billable count of color pixels in the received image data by:

determining a first count of color pixels in the image data in device independent space;

converting the plurality of pixels of the image data into device dependent space;

determining a second count of color pixels for marking in the device dependent image data;

transforming the determined first and second counts of color pixels, and determining a minimum of the two transformed pixel counts.

Another aspect of the disclosure provides a system for processing image data having at least one page using an image processing apparatus. The system includes: an input device for receiving a document containing image data, the image data including a plurality of pixels; and at least one processor including an input and an output associated with the image processing apparatus for processing the pixels of the image data. The at least one processor is configured to: determine a billable count of color pixels in received image data by: determining a first count of color pixels in the image data in device independent space; converting the plurality of pixels of the image data into device dependent space; determining a second count of color pixels for marking in the device dependent image data; transforming the determined first and second counts of color pixels, and determining a minimum of the two transformed pixel counts.

Yet another aspect of the disclosure provides a non-transitory computer readable medium having stored computer executable instructions. The computer executable instructions, when executed by a computer, direct a computer to perform a method for processing image data. The method includes: receiving image data of a document including a plurality of pixels; determining a billable count of color pixels in the received image data by: determining a first count of color pixels in the image data in device independent space; converting the plurality of pixels of the image data into device dependent space; determining a second count of color pixels for marking in the device dependent image data; transforming the determined first and second counts of color pixels, and determining a minimum of the two transformed pixel counts.

Other features and advantages of the present disclosure will become apparent from the following detailed description, the accompanying drawings, and the appended claims.

DETAILED DESCRIPTION

Figure 1:
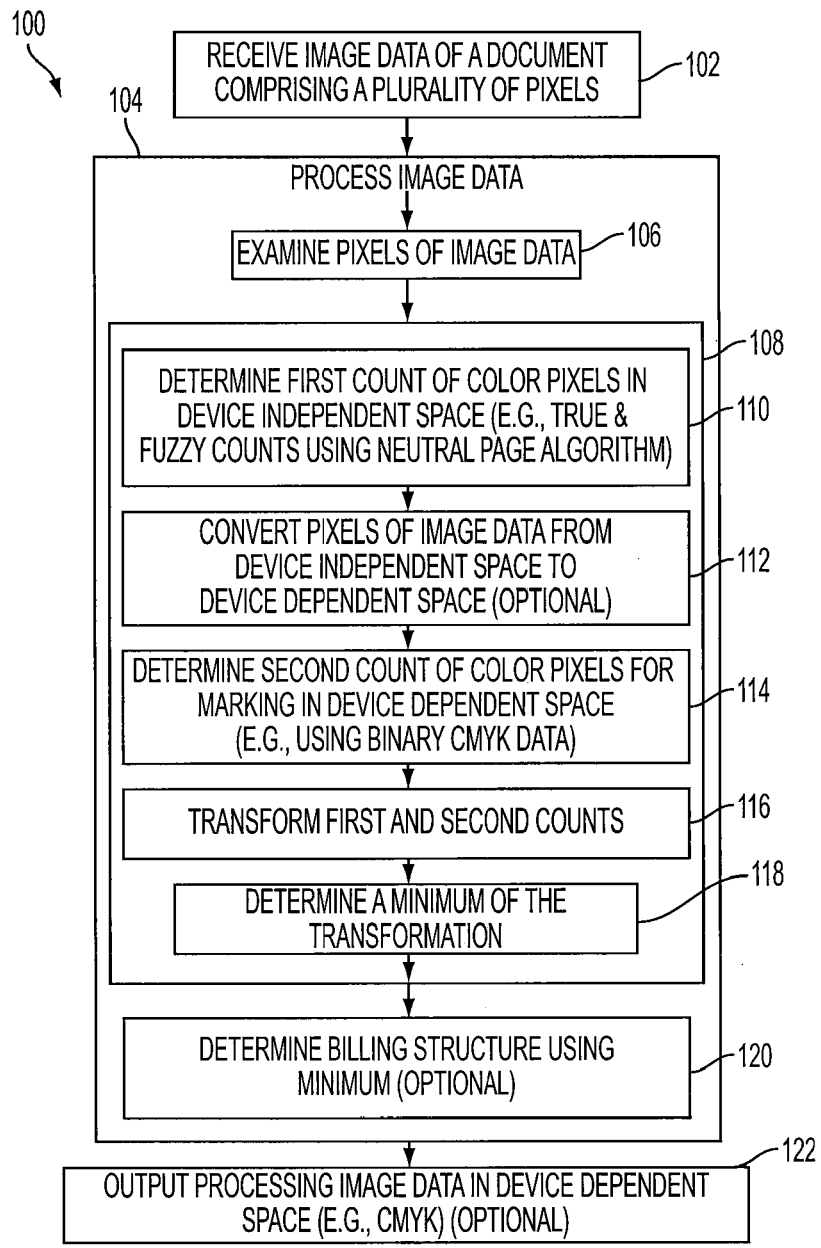
FIG. 1 illustrates a flow chart/block diagram illustrating a method for processing image data in accordance with an embodiment of the present disclosure.

In order to increase the adoption of color usage in the marketplace, the following described system and method provides a simpler and better color pixel counting process and billing options for printing or copying color pages. The billing strategy is determined without counting the rendered neutral or gray pixels as color pixels (rather, e.g., as black/white pixels), and can be at least partially based on determination(s) made in device independent space. This disclosure assists in solving the problem of charging customers a higher cost for marking pixels that are rendered neutral or gray with composite black ink or toner during processing, while also considering a need for easing integration of such a method into current software for billing calculations, changes, and requirements. For example, one exemplary limitation in existing methods is that quite a few values/thresholds are used at various points in a relatively complex logic. The complexity of these existing methods makes it harder to cope with possible requirement changes in terms of how to define billing tiers. This disclosure uses algorithms, methods, and processing elements (e.g., hardware and/or software) in devices or systems (such as a multi-function device) to determine color pixel counts and apply an equation based transformation, and then determining a bill for documents, taking the above into consideration.

This invention proposes a color pixel counting method that expands the simple idea of using the normalized minimum of a CIE Lab-based neutral page detection count and a binary CMYK based count. Specifically, the neutral page based count and the binary CMYK based count are put through some transformation, based on empirical data, before evaluating the minimum of the two. The empirical data is obtained from the print or copy path, which is viewed as the ground truth. The proposed method improves billing accuracy and preserves the flexibility in responding to billing tier decision changes and/or optimization.

Throughout this disclosure, neutral and non-neutral (i.e., color) pixels are used as elements for determining billing strategies (and/or estimating billing costs). The term "pixel" as used herein is defined as an element of data that may be provided in any format, color space, or compression state which is associated with or readily convertible into data that can be associated with a small area or spot in an image that is printed or displayed. Generally, a pixel is defined in terms of value (or brightness or intensity) and its position in an image. A pixel may be associated with an array of other small areas or spots within an image, including a portion of an image, such as a color separation plane. An image generally comprises a plurality of pixels having a number of components that contribute to defining the image when it is either printed, copied, or displayed.

As used herein, "device dependent" color space or image data means color schemes which are tied to or related to color production by a machine, such as printer, scanner or monitor. Many printing or copying machines use additive or subtractive techniques to produce color. Typical device dependent color spaces, for example, include red-green-blue (RGB) or cyan-magenta-yellow-black (CMYK) color spaces. The color gamut is produced by a machine using different combination of these colors.

On the other hand, "device independent" color space or image data, as used herein, means color schemes which are not tied to color production of a machine. Typical device independent color spaces include, for instance, CIE XYZ or CIE L*a*b* color spaces (referred to herethroughout as "Lab" color space, for simplicity purposes only).

The term "neutral pixel" as used herein is defined as a pixel, e.g., when output (copied or printed on a substrate or paper), that is noticeably black, noticeably white, not having any chroma (i.e., no color), or rendered gray during processing, such when using as black ("K") colorant or a combination of colors and/or black to form composite black (formed from a combination of "CMYK"). A neutral pixel is a pixel that conveys black and white or gray information. With regard to some billing schemes, a neutral pixel is a pixel with one or more of its components (e.g. C, M, Y, K) turned ON and that, when viewed in the context of other (neighboring) pixels, gives the appearance of black or gray. For example, pixels, when output on a document, may be rendered gray using black/composite black ink or toner. Neutral pixels have a chroma value that is about and/or close to 0.

A "color" or "non-neutral" pixel as used herein is defined as a pixel that is typically noticeable or perceptible to the human eye as having color, e.g., when on paper. Color pixels have chroma values in excess of zero (0). The term "non-neutral" or "color" pixel as used herein is defined as a pixel that comprises at least one color from a color set (e.g., when output via copy or print) that is perceptible (e.g., to the human eye) and/or recognizable as having color cast. For example, a color pixel may comprise one or more colors such as cyan ("C"), magenta ("M"), and/or yellow ("Y") and be perceived as cyan, magenta, and/or yellow (or other colors) when output. With regard to some billing schemes, a color pixel is a pixel with one or more of its components (e.g. C, M, Y, K) ON, and that, when combined with other (neighboring) pixels, gives the appearance of color. Although neutral pixels might have some chroma or color content and could use color ink, such pixels do not appear (e.g., to the human eye) to have any perceivable color when output, as noted above.

The color spaces associated with device independent image data, device dependent image data, binary image data, and/or contone image data should not be limiting. For example, in an embodiment, device independent image data may be in Lab or standard RGB space. Similarly, for example, in an embodiment, device dependent image data may be in CMYK space.

Generally, in known output systems/devices (e.g., printers, copiers, MFDs), when a document is to be marked, the document is input into a device and the image data is processed in an image path. For example, with reference to FIG. 1, image data comprising a plurality of pixels is received at 102 and processed at 104. Early in the image path when the image data is first processed, the input image data is analyzed/evaluated for black and white (or gray) pixels of image data or color pixels in the image data. In known systems, the pixel count is typically an essentially pure count of color pixels, e.g., determining an amount of color pixels, and determining whether or not composite black ink or toner is added during marking. For example, using a binary CMYK domain only for counting is common in solid ink and/or other marking devices.

This disclosure, however, proposes a combined way of counting color pixels, so that pixels that are rendered neutral with the addition of composite black (i.e., in device dependent space or the binary domain during marking) are not counted as color when determining a billing tier for a customer or a user. Using existing hardware in the image/copy path, in this disclosure, the neutral/color detection results in device independent space (or as provided by a controller) and in device dependent space (or as determined by the marking engine, e.g., binary CMYK) are used together to derive a billing strategy for the image data (of a page or a document) being processed. Although exemplary embodiments are described herein, it is to be understood that such embodiments are not meant to be limiting, and that other methods or algorithms that use neutral pixel determination in combination with pixel counting for billing purposes are within the scope of this disclosure.

In order to reduce or prevent potential billing problems with regards to billing customers for color pixels that do not visually appear to the human eye to contain color, the present disclosure provides a method 100 for determining a billing strategy for outputting documents based on a determined billable pixel count of the image data in the output document/page, as shown in FIG. 1. Generally, a billing strategy or structure is a method by which a charge to a user or customer for printing a document is calculated. A billing strategy may be a calculation method associated with or correlated with tiers, thresholds, values, or algorithms, for example. Further details regarding tiered billing strategies and structures are discussed below with reference to blocks 202-212 in FIG. 2. Further details regarding tiered billing structures are discussed below (and in the incorporated reference(s)). For explanatory purposes, tiers and/or tier levels are interchangeably used as terms throughout this disclosure to represent different categories of images, and billing for said images. Also, it should be understood by one of skill in the art that a billing strategy or structure for marking and outputting documents can be determined based on a determined tier level and using the color count, but can also be determined/calculated by including additional information such as a type of customer, type of device being used for output, etc.

In the described example embodiments, a count of neutral and color pixels in the device independent space and a count of color pixels in device dependent space are determined to thus exclude a count of pixels (and/or objects, neighborhoods, or areas of those pixels) that appear neutral or gray to the human eye (e.g., which are made up of composite black (i.e., contain C, M, Y, and K colorants or medium). For example, even though some color pixels may be output to form grayscale image data, according to this disclosure, the billing strategy for a document with such grayscale image data may be chosen based on black printing or copying modes, based on the amount (or lack thereof) of color to be output. In some cases, a method for counting grayscale or composite black as black pixels, such as disclosed in U.S. application Ser. No. 12/246,956, filed Oct. 7, 2008, by the same assignee, published as 2010/0088201 A1 on Apr. 8, 2010, which is hereby incorporated by reference in its entirety, may be employed for black/white content. The exemplary embodiments herein are described below with reference to counting non-neutral or color (CMY) pixels and without including types of rendered neutral or gray pixels, but should not be limiting. The actual color of the pixel (or combination of colors, e.g., in a neighborhood or area) as determined in device independent space as well as device dependent space are used to determine the billable color pixel count (and thus the selected billing strategy).

Referring back to FIG. 1, illustrated is a flow chart/block diagram illustrating a method for processing image data in accordance with an embodiment of the present disclosure. Each of the method steps that are shown in FIG. 1 and throughout this disclosure may be implemented by a computer or a processor, for example, and are not meant to be limiting. For example, the elements or modules as shown in FIG. 3 may implement the herein described methods.

Figure 3:
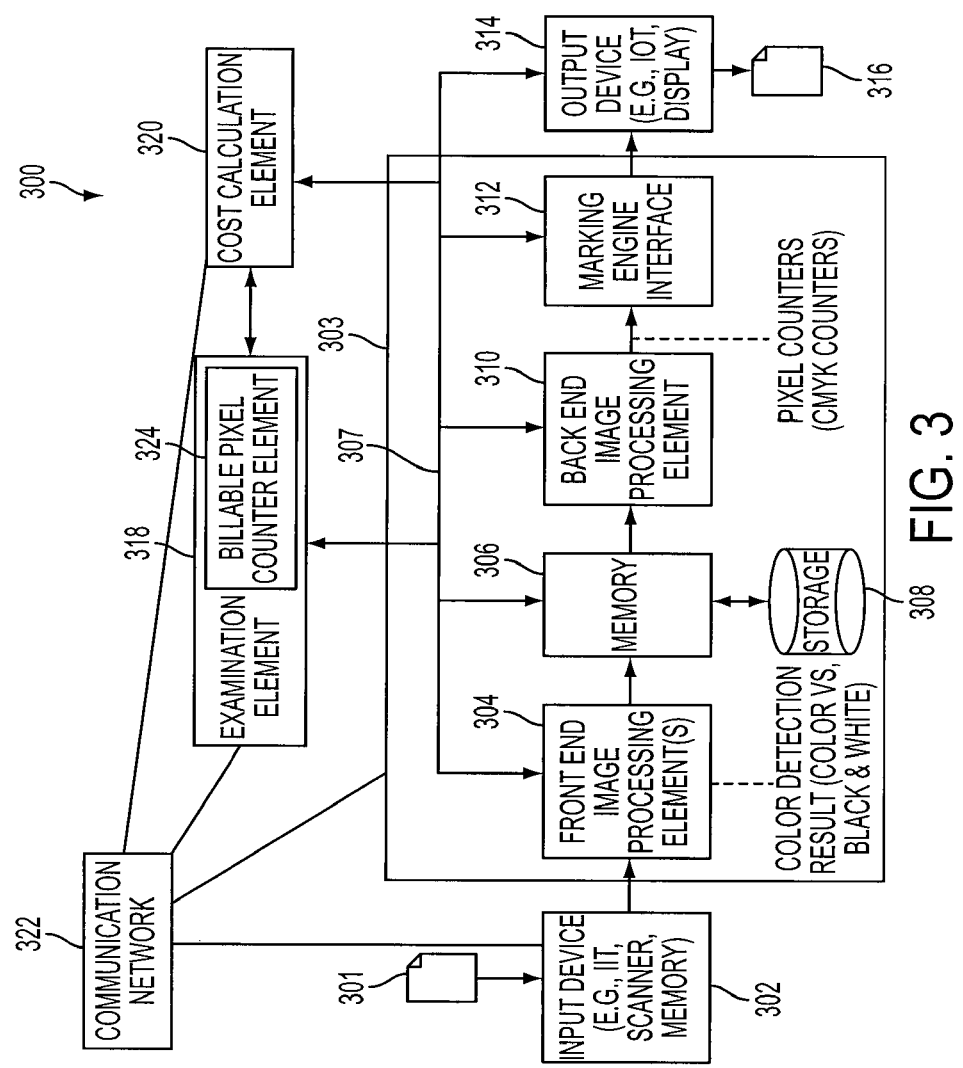
FIG. 3 illustrates a block diagram of an exemplary image path for processing image data in accordance with an embodiment of the present disclosure.

As previously noted, the method 100 begins at step 102 in which a device/image processing apparatus/processor (e.g., such as shown in FIG. 3) receives a document comprising at least one page of image data. The image data comprises a plurality of pixels. In some embodiments, the image data is received in device independent space. Alternatively, the image data may be in device dependent space. For example, the image data may be received in contone or RGB color space, or alternatively, comprise black and white pixels. Device dependent color space values, such as RGB and CMYK, may be converted to a device-independent color space, such as CIE Lab color space, using transformation algorithms or a look-up-table (LUT), as known in the art; or, using ICC color management profiles associated with the printing system. The received image data in step 102 is representative of any type of page or document and may include a variety of objects to be detected and used by method 100; however, method 100 may use a document that includes any combination of objects (including text). For example, the document may include objects such as monochrome text object(s) and/or color text object(s).

In one embodiment, the received image data of the document is based on a hard copy original that is converted into digital image data, i.e., copied or scanned. A hard copy of a page or pages can be input into an input device and used for reproducing an output document. However, the input device and/or input method of receiving the image data are not limited.

After receiving image data in 102, the image data is processed at 104. Such processing may include converting the input image data into device independent color space, for example, if the image data is not already in device independent color. Techniques for converting image data from a device dependent color space to a device independent color space are well-known in the art and therefore not discussed in detail herein.

The pixels of the image data for each page of the document are then examined at 106. At 108 processing steps are applied. As shown, the processing at 108 can include determining at 110 a first count of the color pixels in the image data. In accordance with an embodiment, a first count is defined as a one or more determinations relating to color pixels in image data that is determined using a neutral page detection algorithm. For example, the pixels (e.g., resulting from a hard copy original) can be analyzed and/or processed to determine if the pixels in the image data are neutral or non-neutral (and/or any other pixel classifications levels) (i.e., color based). That is, the pixels can be analyzed, either in device independent space (e.g., CIE Lab, YCbCr) or in device dependent space, to determine a degree of neutrality (a degree to which each pixel is neutral or non-neutral). In accordance with one embodiment, a first count of color pixels is determined in device independent space. In accordance with another embodiment, a first count of color pixels is determined before being processed into binary data used for marking. Also, a first count determination may include more than one class, type, or category of color pixels (e.g., based on a degree of neutrality). Such determinations may include, but are not limited to: neutral, fuzzy neutral, fuzzy color, non-neutral, true color, and/or other classifications that represent a degree of color. In some cases, the count of each class of pixels in the image data can be compared to a total number of pixels in the image data (or document or page).

In one embodiment, for example, a count of true color pixels and a count of fuzzy color pixels are determined as part of the first count at 110. As used herein, "true color" means a pixel having color which corresponds to actual or noticeable color by the human eye. In other words, the pixel color includes some chroma. "Fuzzy color" means a pixel having color which is not definitive of actual color or discernible by the human eye. These may correspond to rendered neutral pixel colors, composite black, as well as neither very neutral, nor very colorful pixel counts. The true color and fuzzy color counts may be determined by counters in a system (e.g., such as in system 303). For example, in an embodiment, pixels may be compared against a set of thresholds, and a number of pixels exceeding the set of color thresholds may be determined. Those pixels that exceed the set of thresholds may be used for the color count and/or to determine if a page is neutral. In another embodiment, a ratio of the pixel counts (e.g., compared to a total number of pixels in the image data)(or percentage based on the total amount) can also or alternatively be used to compensate for the scaled image and to have a count comparable to the CMYK counters.

However, the methods or steps for determining if a pixel is neutral (or not) or the degree to which it is neutral/color should not be limiting. Any number of neutral page or neutral pixel determination methods may be implemented with this disclosure that currently exist or that are developed in the future. Moreover, the type(s) and number of counts for classifying the pixels is not limited, and may, in some instances, be determined based on the type of machine or device being using for printing or copying.

Upon determining the first count of the color pixels in the image data, the image data (of the document or page) can be optionally converted from device independent space to device dependent space at 112, for example. One of ordinary skill in the art understands that the image data may be further processed and/or manipulated before being converted to device dependent space that is associated, for example, with a marking engine. In an embodiment, the pixels of image data (e.g., resulting from a hard copy original) are processed and converted to device dependent space at 112.

Then, at 114, a second count of color pixels for marking (e.g., using a marking device in an apparatus or system) is determined. In accordance with an embodiment, a second count is determined based on device dependent image data. In accordance with an embodiment, a second count is defined as a one or more determinations relating to color pixels in image data that corresponds to binary marking data. In an embodiment, the second count of pixels is made based on data in a device dependent space (e.g., dependent upon a select marking device). For example, the determined count of pixels for marking may comprise counting based on at least a number of C, M, and Y pixels in the image data for marking (e.g., onto a page), i.e., a binary CMYK-based count.

These first and second counts from 110 and 114 are used in the processing of the receiving image data to determine the billable color pixel count—also referred to herein as final color pixel count. This billable color pixel count is used to determine a billing level, tier, or billing strategy for copied or printed documents.

One embodiment for determining the billable color pixel count based on a combination of first and second counts from 110 and 114 is illustrated at 116 and 118 in FIG. 1. After the determination of first and second counts at 110 and 114, the determined first and second counts of color pixels are transformed at 116. That is, as used throughout this disclosure, to "transform," perform or apply a transformation to a pixel count(s) refers to converting the pixel count(s) into a data value(s) that can be used to determine a billable color count of an output document.

For example, a linear transformation, algorithm, or other transformation can be applied to the first and second counts to transform the data resulting from the two counts into numerical data values. The first count (e.g., neutral page detection-based count) and second count (e.g., binary CMYK-based count) are put through some transformation that is based on empirical data. Empirical data, which is viewed as ground truth, can be obtained from an output print or copy path (e.g., the point at which data is marked in the image path) of an image processing apparatus or MFD, and used for or with the transformation at 116.

Then, at 118 a minimum of the transformation (e.g., at 116) is determined. More specifically, a minimum color pixel count is determined. The "pixel count" is a metric related to a number of pixels of a predetermined type, e.g., pixels that visibly appear as color when marked. As used herein, terms such as "minimum" shall apply to a value or metric that is smaller than other values or metrics within a given practical situation, and should not imply any kind of absolute or provable mathematical minimum. Accordingly, a minimum color pixel count for outputting the image data is determined at 118.

In accordance with one embodiment, the transformation is performed before a minimum is evaluated. For example, the same transformation may be applied to each of the two counts separately, or a transformation may be applied to two or more different combinations of the first and second counts. Then, a minimum of the transformations is used as a final color pixel count (billable pixel count). In an embodiment, the two transformed pixel counts are compared and the smaller pixel count of the two is selected as the final color pixel count. An example of applying a linear transformation to the counts in such a manner is described later.

In another embodiment, a first transformation is applied to the first count of color pixels and a second transformation is applied to the second count of color pixels. The first and second transformations of the counts can be similar or different. The minimum determination includes determining a minimum of these first and second transformations. For example, the individual transformations of each count can be combined, and then a minimum taken. In yet another embodiment, a minimum between each individual transformation is taken, and then the minimums are combined to determine the final color pixel count used for billing.

In still another embodiment, the determination of the billable count of color pixels may be based on a true color pixel determination from the first count. For example, in an embodiment the determination includes comparing the number of true color pixels determined from an applied neutral page determination algorithm (e.g., applied to digitized image data resulting from a copied original document) to a predetermined threshold. Based on the results of the comparison, a transformation is applied to data from the first and/or second counts. For example, referring to the above comparison, if the true color pixel count is greater than the predetermined threshold, the determination of billable color pixel count can include applying a first transformation algorithm using the determined number/count of true color pixels therein, and then determining the minimum between the first and second counts from 110 and 114. Alternatively, if the true color pixel count is less than the predetermined threshold, the determination of billable color pixel count may include applying a second transformation without using the number/count of true color pixels, and then determining the minimum between the first and second counts from 110 and 114.

In yet another embodiment, the number or count of true color pixels and fuzzy color pixels are normalized to account for resolution differences in the first count (e.g., determined in device independent space) and the second count (determined in device dependent space), i.e., their values are adjusted to a notionally common scale because they are obtained (e.g., scanned) using different scales.

The order of transforming the counts at 116 and determining a minimum of the transformation at 118 as shown in FIG. 1 is not meant to be limiting. Accordingly, steps 116 and 118 as depicted in FIG. 1 for method 100 are exemplary. Despite the application of steps, the first and second counts are configured to be combined and transformed, and used for billing purposes. Based on a combination of these counts, billing accuracy for outputting color documents is improved and flexibility in tier-based billing decisions (including changes to or optimization thereof) is preserved.

More specifically, in one embodiment, fuzzy and true color counts using a neutral page determination and a binary CMYK based count are employed to determine a billable count of color pixels in image data. Thus, method 100 discloses a way of using processed information from both neutral page detection and binary marking determinations to count or calculate visible color pixels for output from the image data to use for billing purposes.

This disclosure may also implement a billing strategy based on a plurality of billing tiers defined by predetermined thresholds at which to determine the billing tier/level for the image data. These tiers can be configured to be used by a processor such that one billing tier is selected and used to bill for outputting the image data (e.g., via copying). A billing structure or strategy may be optionally determined or selected at 120 using the minimum determination of the transformation (e.g., the minimum of the final color pixel count). Accordingly, in an embodiment, the transformed color count used for billing is based on a combination of the determined counts of color pixels based on neutral page detection (determination at 110) and the determined counts of pixels for marking (determination at 114). The transformed color count can be used to determine a billing tier and a cost for billing for output of the document image data, for example.

Optionally, after the billing structure is determined at 120, the processed image data may be marked and output at 122 using a marking/output device (such as marking engine interface 312 in system 303).

In the above method, the number of billing tiers used with the image processing apparatus or output device should not be limiting. In an embodiment, it is envisioned that the billing tiers may be determined or based on a threshold value. For example, in an embodiment, the chosen or determined billing structure or strategy is based on a selected billing tier which has been based on transformed counts of pixels, as compared to a threshold. That is, the page or document may be billed by choosing a billing strategy associated with a tier (e.g., Tier 1, Tier 2, Tier 3) that satisfies the thresholds. One or more thresholds may be used to separate billing tiers which may be used to charge a customer. Such multi-tier billing plans provide options to the customer that better match types of printed or copied documents and workflows. Additionally, two-tier and three-tier meter billing plans may replace black-only and color-only billing structures, which is more satisfactory for the customer and supplier.

As an example, the 3-tier color distribution may include: neutral color, everyday color, and expressive color use. Documents determined to be of neutral color may include image data comprising no color (i.e., black and white image data) to a very small amount of color, where the amount of color is less than a threshold CMY_TH1. Documents of everyday color may include image data comprising color that is greater than threshold CMY_TH1 and less than a threshold CMY_TH2, wherein CMY_TH2 is a threshold greater than CMY_TH1. Documents of expressive color may include very colorful images, wherein a color amount of the document is greater than threshold CMY_TH2. As understood by one of ordinary skill in the art, the thresholds CMY_TH1 and CMY_TH2 may be predetermined or dynamic thresholds that are used for analysis of the image data. For example, in an embodiment, the thresholds CMY_TH 1 and CMY_TH2 may comprise three (3) and ten (10) percent (%), respectively. Further discussion regarding such thresholds is provided in the incorporated '298 application, for example.

In accordance with an embodiment, the three tiers may be defined as follows: Tier 1: all black and white documents and documents with a small amount of color are billed at black and white rate (e.g., neutral, level 1 impressions); Tier 2: documents with more than a small amount of color but less than a large amount of color are billed at a lower than market color impressions rate (e.g., everyday color, level 2 impressions); Tier 3: documents with large amounts of color that are billed at a competitive market color impressions rate (e.g., expressive color, level 3 impressions). However, this example is not meant to be limiting and could extend to N-tier level billing systems. To determine such tiers, break-points, percentages, or thresholds may be used. In an embodiment, the thresholds for dividing the image into tiers may be based on a percentage of color, based on the billable pixel count as compared to a total number of pixels, for example. However, the counts, percentages, and/or thresholds (and methods of defining the counts, percentages, and/or thresholds) that are used to determine the tiers (e.g., ratio, percentage, pixel count) should not be limiting.

Figure 2:
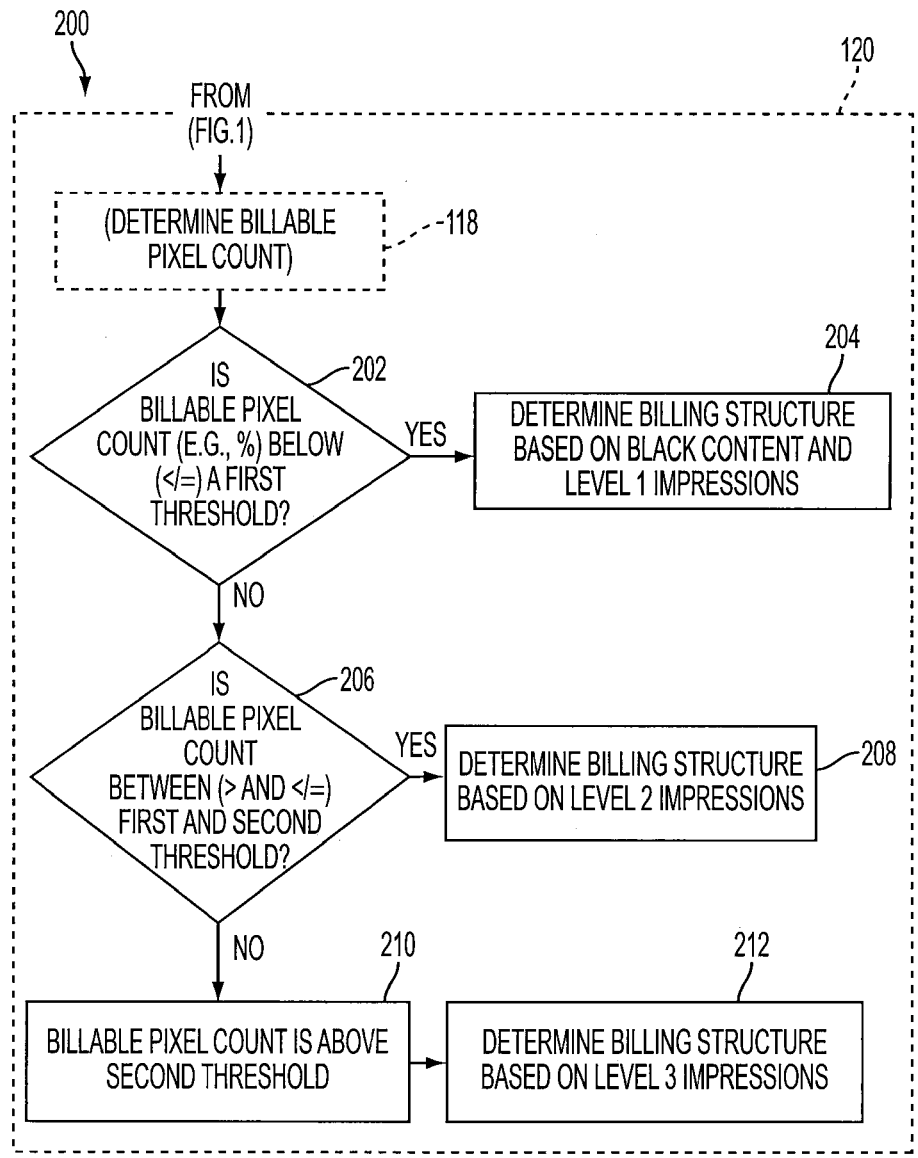
FIG. 2 illustrates an example of a method for determining a billing tier for image data in a 3-tier threshold billing structure.

FIG. 2 illustrates an example of a method or process 200 for determining a billing structure, or, in this case, a tier at which the data should be billed after output, at 120 in FIG. 1, using a 3-tier threshold. For example, after the billable pixel count (i.e., a determined minimum of the transformation) is determined at 118, it can then be determined, as shown at 202, if the billable pixel count is below a first threshold. If yes, the billing structure is determined based on black content/level 1 impressions, as shown at 204. If the billable pixel count is not below a first threshold, i.e., no, but determined to be between the first and a second threshold as shown at 206, the billing structure for the page is determined based on level 2 impressions as indicated at 208. If the billable pixel count is not between the first and second thresholds, i.e., no, the coverage is determined to be above the second threshold at 210, and the billing structure for the page is determined based on level 3 impressions as shown at 212.

The description below discloses exemplary embodiments encompassing the features of method 100 that may be implemented by one or more modules in an apparatus for determining a final color pixel count that is used for billing and outputting documents in accordance with this disclosure. Such formulas are exemplary and their use is not exclusive or required. That is, this disclosure may use any number of alternate formulas, algorithms, linear transformations, or other transformations to determine color pixels for billing in received image data.

In an embodiment, image data is provided in a color space (having been received or converted thereto) for processing, such as, for example, CIE Lab color space, or any other luminance-chroma based color space image data (not necessarily device independent). A first count of pixels, or groups of pixels, are determined as being true color or fuzzy color using a neutral page detection algorithm, and counted (e.g., using counters) for each image, page, or document. A second count of pixels is determined based on binary CMYK color space image data.

In one embodiment, the following formula is used to determine the final color pixel count:

$$\text{colorCount} = \min(\text{FactorBC}*\text{BCCnt} - \text{OffsetBC}, \text{FactorNC}*(\text{WtFC}*\text{FCCnt} + \text{WtTC}*\text{TCCnt}) - \text{OffsetNC}),$$

where colorCount is defined as the final color pixel count used for billing determinations, BCCnt is defined as a binary CMYK based count, FCCnt is defined as a fuzzy color count from neutral page detection, TCCnt is defined as a true color count from neutral page detection, and FactorBC, OffsetBC, FactorNC, WtFC, WtTC and OffsetNC are each programmable parameters, defined as follows:

FactorBC is defined as a weight factor of Binary CMYK count,

OffsetBC is defined as an offset applied to Binary CMYK count for equation calculation, FactorNC is defined as an overall Factor applied to neutral page counters equation transformation, WtFC is defined as a weight factor applied to neutral page fuzzy color count, WtTC is defined as a weight factor applied to neutral page true color count, and OffsetNC is defined as an offset applied to neutral page counters equation calculation.

Note that the fuzzy color count and the true color count are normalized to account for the resolution difference between the final copy and the image going into the neutral page module. For example, if the neutral page fuzzy color/true color counts are obtained at 75 dpi (fast scan)×150 dpi (slow scan) and the binary CMYK count is obtained at 450 dpi (fast scan)×567 (slow scan), a factor of 450×567/(75×150), or 22.68 is applied for normalization.

In a variant embodiment, a case checking logic is added before determining the minimum. For example, a true color count may be compared to determine the factors used for determining the final color pixel count used for billing, e.g.:

if (TCCnt>ThreshTCCnt), then $$\text{colorCount} = \min(\text{FactorBC}*\text{BCCnt} - \text{OffsetBC}, \text{FactorNC}*(\text{WtFC}*\text{FCCnt} + \text{WtTC}*\text{TCCnt}) - \text{OffsetNC});$$

else $$\text{colorCount} = \min(\text{FactorBC1}*\text{BCCnt} - \text{OffsetBC1}, \text{FactorNC1}*\text{FCCnt} - \text{OffsetNC1}),$$

where ThreshTCCnt, FactorBC1, OffsetBC1, FactorNC1 and OffsetNC1 are each programmable parameters, defined as follows:

ThreshTCCnt is defined as a predetermined threshold for true color count,

FactorBC1 is defined as a factor applied to binary CMYK count,

OffsetBC1 is defined as an offset applied to Binary CMYK count for equation calculation, FactorNC1 is defined as an overall Factor applied to neutral page counters equation transformation, and OffsetNC1 is defined as an offset applied to neutral page counters equation calculation.

The following is a list of sample parameters that are not limiting:

FactorBC=1.35
OffsetBC=255,000
FactorNC=1.51
WtFC=1.0
WtTC=1.0
OffsetNC=160,000
ThreshTCCnt=1,000
FactorBC1=1.31
OffsetBC1=235,000
FactorNC1=4.05
OffsetNC1=30,000

The disclosed method achieves a level of improvement in billing accuracy over current methods by decoupling color pixel counting from categorization or classification of the image data, while still using combined counts to optimize the final color pixel count used to determine a bill. It is also not limited with regards to a need for complex data tuning or modification of the requirements needed for billing consideration. By deriving a color pixel count through an equation based transformation instead of categorizing images through a complex decision process, the disclosed method is not only smoothly integrated into current software for billing calculation, but also provides the ability to cope with requirements change much more easily. It eases the computational complexity for determining a billable color pixel count as well. It is also simpler to comprehend and can ease communication, as needed, with customers regarding billing determinations for outputting documents.

The examples provided above are not limiting, and it should be noted and understood by one of ordinary skill in the art that other variant embodiments are possible. For example, as previously mentioned with regards to 116 and 118 in method 100, in one embodiment, the method for determining a final color pixel count for billing includes applying piecewise linear or other transformations to the binary CMYK count and the neutral page detection count individually, before taking the minimum of the two. The transformations can be combined before taking the minimum, or the minimums can be determined and combined to determine the billable color pixel count. Moreover, in an embodiment, a minimum of the first and second counts (individually or combined) is determined (rather than a minimum of the transformation).

This approach is based on an image content dependent method, which takes into account many if not most or all available parameters used to determine color content, and produces more accurate billing results for the image data that is processed and marked for output. It also uses counters from multiple neutral detection sources in conjunction with each other and with counters from the marking engine along the image path, which also provides improved accuracy for billing.

The above-described exemplary methods are exemplary and illustrate two examples of ways of using processed information from both neutral page detection and binary marking determinations to count or calculate color pixels from the image data to use for billing purposes. In one embodiment, the information for billing is based on data from device independent space and device dependent space. From a customer point of view, the methods disclosed herein not only avoid the mistake of billing a neutral page or gray pixels as color, but also determine an accurate billing structure based on visibly output color.

The herein described methods may be used by any MFD (or printer or copier) manufacturing companies that wish to implement image paths capable of rendering pixels neutral with composite black without counting these pixels as color in billing, for example.

FIG. 3 illustrates a block diagram of an example of an image path 300 for processing image data of a system, device or image processing apparatus 303, such as an MFD. The system/device/apparatus 303 comprises, among other devices, an input device (e.g., IIT or memory) 302, a processor or processing elements represented by 304 and 310, a memory 306 and/or a storage device 308, and an output device (e.g., IOT) 314 and/or marking engine interface 312. The image path 300 of the system 303 may also include an examination element 318 and/or cost calculation element 320 which may be a part of the system 303 itself or in communication with the processing elements 304 and 310, for example. Generally, the above elements (as will be described) of the device are provided to perform functions that assist in receiving image data such as a scanned document, configuring the image path of the processing elements 304 and 310 (and possibly elements 318 and 320) to process the image data, and, if needed, outputting the image data such as by marking a document according to an output mode that may be selected. However, it should be noted that the apparatus or device may comprise additional elements not described herein or alternative elements for performing similar functions, and should not be limited to those elements as illustrated in FIG. 3. Generally, the image path shown in FIG. 3 corresponds to any number of output modes that may be selected for an image processing apparatus, system, or device.

The input device 302 is used to deliver image data of a document to the system 303 and/or processing elements in the image path. In some embodiments, the input device 302 is used to scan or acquire an input document 301 or page into image data, such as when copying a document, for example. The input device 302 may be a digital scanner, for example. Generally, however, any device used to scan or capture the image data of a document for an image processing apparatus may be used. For example, the image data may be captured by a scanner in a copier, a facsimile machine, a multi-function device, a camera, a video camera, or any other known or later device that is capable of scanning a document and capturing and/or inputting electronic image data. The input device 302 may include submission of electronic data by any means and should not be limiting. In other embodiments, the input device 302 may be an electronic device for inputting electronic image data. In some embodiments, input device 302 may be connected to a network 322 or telephone system, for example, to receive as input image data such as via a facsimile (fax) machine or computer (CPU). Input documents and/or image data that is received electronically may be received via a telephone number, an e-mail address, an Internet Protocol (IP) address, a server, or other methods for sending and/or receiving electronic image data. The network may be a digital network such as a local area network (LAN), a wide area network (WAN), the Internet or Internet Protocol (IP) network, broadband networks (e.g., PSTN with broadband technology), DSL, Voice Over IP, WiFi network, or other networks or systems, or a combination of networks and/or systems, for example, and should not be limited to those mentioned above.

If needed, the input or received image data may be converted using the input device 302 and/or processing elements in the apparatus 303. For example, in embodiments, the image data may be converted from device dependent space to device independent space (e.g., RGB to L*a*b). Alternatively, the image data may be received in device independent space (e.g., L*a*b). The type of image data received and the type of input devices documents are received therefrom should not be limiting.

In any case, image data, such as image data for an original document 301, may be received or input in either device dependent or device independent space from the input device 302, depending on the capability of the input device or the architecture of the system. The input device 302 may capture image data as binary or contone image data, for example. Generally, when the input image data from the input device is received in device dependent space, the processing elements in the image path will typically convert such image data to some device independent space for further processing before converting the image data to device dependent space (e.g., to be output). The input and output devices deal with different device dependent color spaces, and most of the image processing in the image path 300 is performed in a device independent space to produce output images of the highest possible quality.

FIG. 3 also shows a processor or processing elements for processing and/or manipulating image data using a plurality of operations and/or processes. The description of the processing elements below is an example of devices capable of implementing processes to be performed and should not be limiting. For example, additional processing elements may be provided along the image path 300. Additionally and/or alternatively, additional operations may be performed on the image data other than or in addition to those described with reference to these figures.

The image path 300 of system 303 may comprise a plurality of image processing elements (or processor) for manipulating image data received from the input device 302 using a plurality of operations and/or processes. The processing elements may be a combination of image processing elements which comprise software and hardware elements that perform a number of operations on the image data received from the input device 302 (e.g., IIT/scanner, memory, or other source) using a set of parameters. The parameters are used to convert the images to the format desired as output (e.g., high quality) along the image path. The processing elements may be a part of a computer system, device, or apparatus such as a xerographic system, a photocopier, a printing device, or a multi-function device (MFD). For simplicity purposes, the term "processing element" throughout the application will refer to one or more elements capable of executing machine executable program instructions. It is to be understood that any number of processing elements may be used and that additional operations or processes besides those described below may be provided in an image path.

More specifically, the image path of FIG. 3 comprises a front end processing element(s) 304, a memory 306, storage 308, and a back end processing element(s) 310. Each of the devices or elements in the image path may be communicating with each other, as represented by path 307. The front end processing element(s) 304 may comprise any number of processing elements/modules and is/are image processing elements that receive image data in a beginning of an image path and is/are used to process the image data according to user preferences such that it may be stored and later retrieved for output. The back end processing element(s) 310 may comprise any number of processing elements/modules and is/are generally used at the end of an image path to retrieve stored image data and to process the image data such that the image data may be output to a marking or printing device as an accurate recreation of the original input or scanned image. Of course, processing elements may also be used for compression and/or decompression of image data.

In an embodiment, one or more of the elements (e.g., processing elements 304, 310 and memory 306/storage 308) of system 303 may be connected to a network 322 or telephone system, for example, for communication with other devices, systems, or apparatuses. For example, in some cases, image data or executable instructions may be provided via a computer (CPU) connected to the network 322. As further described below, in a possible embodiment, at least one processing element of system 303 may implement an operative set of processor executable instructions of a billing system. Such a billing system or the executable instructions may be provided via the network 322, for example.

Each of the image processing elements comprises an input and an output. Additionally, the system, device, or apparatus may also include one or more controllers or routers (not shown) to select and route the image data between the processing elements 304 and 310 and memory 306 and/or storage 308, and other elements described below, for example.

Front end processing element(s) 304 receives (e.g., as input) the image data from the input device 302 and processes the image data. The image data may be received as input via a scanning engine interface, for example, such as when copying and turning a hard copy document into image data. Alternatively, the image data may be received electronically, such as from a memory device, storage device (portable or remote), et al., such as when printing a saved document. As such, the form in which image data is received should not be limiting. Front end processing element(s) 304 may be used to process the scanned image data as well as determine user-defined operations generally known in the art. For example, the front end processing element 304 may be used for color space conversion, reduction or enlargement, document registration, and/or performing other operations or processes on the image data, for example. In some embodiments, the front end processing element 304 converts the image data (e.g., from device dependent to device independent image data, when received via a scanner) for processing and determines neutral and non-neutral pixels. In one embodiment of the herein disclosed method, front end processing element 304 may be used (alone or in cooperation with other elements) to determine a billing structure, such as noted at 120 of the method 100 in FIG. 1.

Memory 306 and/or storage 308 may be used to store image data. For example, memory 306 and/or storage 308 may be used to temporarily store the original image data of document input via input device 302. Converted (e.g., binary to contone image data) or compressed image data may also be stored in the memory 306 and/or storage 308. Memory 306 and/or storage 308 may be used to store machine readable instructions to be executed by the processor/processing elements. The memory 306 and/or storage 308 may be implemented using static or dynamic RAM (random access memory), a floppy disk and disk drive, a writable optical disk and disk drive, a hard disk and disk drive, flash memory, or the like, and may be distributed among separate memory components. The memory 306 and/or storage 308 can also include read only memory, or other removable storage drive(s) or memory devices.

The front end processing element(s) 304 may communicate with memory 306 and/or storage 308 of system/apparatus 300 to store processed and/or compressed image data, for example. Compressed image data may be stored in memory 306 and/or storage 308 temporarily or for a later time when needed. When the image data is needed or it is time for marking (e.g., using the marking engine interface 312 or output device 314), the image data may be retrieved from memory 306 and/or storage 308 via the back end processing element(s) 310 to export the image data that has been scanned, for example.

Back end processing element(s) 310 receives processed image data from the memory 306 or storage 308. Back end processing element (s) 310 may be used to further render the image data for output. For example, back end processing element 310 may be used to convert the color space of the processed image data (e.g., convert from device independent CIE L*a*b color space to device dependent CMYK color space), provide color balance, further rendering, filtering, and/or other operations or processes. Subsequently, back end processing element(s) 310 may be used to decompress the image data and output the image data via the IOT 312 and/or output device 314. The output of processed image data from the back end processing element 310 depends on the image path (or output mode). The back end processing element(s) 310 may be used for calculating the amount of CMY color coverage/pixel locations and/or to determine the toner/ink consumption of the output device 314.

In an embodiment, the processed image data may be directly output to the marking engine interface 312 for printing using an output device 314. The marking engine interface 312 and/or output device 314 may be associated with a printer, a copier, or an MFD which is used for printing documents. In some cases, the marking engine interface may be a part of the output device 314. The marking engine interface 312 and/or output device 314 are used to output the processing image data to the printer, for example. Specifically, the marking engine interface 312 may be designed to receive the reconstructed and processed image data in device independent space in order to send or output the image data to the output device 314 (e.g., printer) for a copy or print job. The marking engine interface 312 may further perform image processing on the image data to make corrections or compensate for deviation in the printing process. Alternatively, the back end processing element(s) 310 may be used to perform further image processing on the image data.

The marking engine interface 312 outputs processed image data to the output device 314 for outputting the image data of the document. The type of output device 314 should not be limiting. For example, the output device 314 may comprise an image output terminal (IOT), display, screen, printing device, copying device, MFD, or others devices, as generally noted above. The display or screen may be a part of a computer (CPU) or user interface (UI) or may be provided to relay information from a website or other device via a network 322, for example. In some cases, a UI may be provided directly on the apparatus/device, while in others a UI is provided as a separate electronic device.

In an embodiment, the processed image data may be output to a printer (e.g., drum or roll for applying to paper) to complete the image path, for example. Of course, the algorithms and processes used by the elements in the image path shown in FIG. 3 should not be limiting. Any number of data compression algorithms (e.g., lossless, lossy), decompression algorithms, color conversion algorithms (e.g., contone to binary, or binary to grayscale) and the like may be performed to provide a high quality output document 316.

It should be noted that the output quality of image data from an output device 314 such as a MFD may depend the type of system or device (and its available output modes/resolution). In some cases, multiple output quality modes, each with a different resolution, are supported.

In an embodiment, the system or apparatus 303 may further comprise one or more elements for determining a billing structure, strategy, and/or a billing cost for outputting a page or document via an output device such as device 314 (e.g., using the final color pixel count). For example, as shown in FIG. 3, an examination element 318 and/or cost calculation element 320 may be provided. In an embodiment, the examination element 318 and/or cost calculation element 320 may be a part of the image data the system 303. In an embodiment, the elements 318 and/or 320 are separate from the image path of the system 303. In an embodiment, the features, calculations, and/or determinations provided by examination element 318 and/or cost calculation element 320 may be incorporated into one or more processing elements, such as elements 304, 310, or 312, and therefore such elements should not be limited to the illustrated embodiment.

Examination element 318 may be configured to examine the image data. The examination element 318 may assist in determining the billable pixel count of color pixels in the image data. For example, the examination element 318 may comprise a billable pixel counter element 324 that is configured to perform any of the counting steps such as 114, including 128 and 136, in device dependent space.

The examination element 318 may operatively communicate with a cost calculation element 320. The cost calculation element 320 is configured to calculate a billing cost or an approximate cost for outputting the page and/or document of image data using the determined billable pixel count (final color pixel count). The billing cost may be calculated and based on a determined billing tier. For example, if it is determined that a page is to be billed using a Tier-2 of a multi-tiered billing structure, the cost associated with Tier-2 may be employed.

In an embodiment, the billing cost is further calculated based on a type of output device to be used. For example, when copying or printing to a printer or MFD, the chosen type of output device may alter the cost for copying or printing the page or document due to the plurality of output modes, inks, toners, and other elements which contribute to the quality of the output document 316. In an embodiment, the cost calculation element 320 is configured to operatively communicate with the examination device 318 and at least one of the processing elements (such as 310 or 312) to calculate a billing cost for outputting the page and/or document.

In a possible embodiment, examination element 318 and cost calculation element 320 are part of a billing system to be implemented by an operative set of processor executable instructions configured for execution by at least one processor or processing element. The billing system may be provided at a remote location with respect to the at least one processor. In an embodiment, the at least one processor is provided in an image processing apparatus, which may comprise an input device for inputting image data and an output device for outputting image data. In an embodiment, the at least one processor of the billing system is provided at a remote location with respect to an output device. As noted above, at least one processing element of system 303 may implement the operative set of processor executable instructions of the billing system by communicating via the network 322, for example. The at least one processing element may thus be provided in the same or a remote location with respect to the output device. In some cases, the examination element 318 and/or cost calculation element 320 may communicate an approximate cost or billing cost to the processor/system 303. In some cases, the examination element 318 and/or cost calculation element 320 may be a part of the processor which communicates with system 303 or an output device.

In a possible embodiment, the cost calculated by the cost calculation element 320 (or its associated processing element) may be sent directly to the output device 314. For example, as shown in FIG. 3, the cost calculation element may communicate via path 307 the approximate billing cost to the output device 314. In this case, the cost may be output via a display, screen, or even a print job. By providing the cost in such a manner—i.e., before outputting the image data via a printing or copying output device—the customer can decide if the image data should be marked via interface 312 and output device 314, or if the data should be saved/discarded (e.g., such as if the cost is too high). The customer may choose to output the image data (e.g., via contact with network 322 or system 303) through the use of an activation button, for example (e.g., see FIG. 1 at 122).

Also, it is envisioned that an embodiment in accordance with this disclosure may include a system that utilizes a network connection 322 for proposed billing estimates. For example, a customer may submit a proposed job (e.g., document) to a website such that a cost estimate for outputting (e.g., printing or copying) the job may be provided to the customer via such website. In an embodiment, it is envisioned that the estimate of how much the job will cost may be determined by considering a predetermined type of printing apparatus for output. Depending on the type of device, apparatus, or machine used for output, the cost estimate of the job may differ. Additionally, in an embodiment, it is envisioned that the system and/or website may estimate theoretical costs of the job if the document is printed with alternative type of printing devices or apparatuses, and that such theoretical costs may be presented to the customer (e.g., via the website). These alternative types may include but are not limited to, different brands or types of machines (e.g., company make and model), different output resolutions/capabilities, or different print shops, for example. A system and/or website may utilize a method such as method 100 to estimate such costs, for example. The system may comprise similar elements noted with respect to the image path of the system 300 in FIG. 3, including, but not limited to, a communication device (such as a network), examination element, cost calculation element, processor and processing elements, for example. The system may include a personal computer (PC) or display device for displaying an estimated cost being communicated via a connected network. The network may include any type of network such as the Internet, Wi-Fi, DSL, local area network (LAN), or wide area network (WAN), for example. Such a system is advantageous to a customer as it allows the customer to review theoretical costs before any actual printing or marking occurs. The customer is able to decide, based on a cost estimate, if the job should be output (e.g., marked), without actually outputting the job. Furthermore, the customer may make a decision whether or not to output a job based on types of printing machines. For example, if the system/website includes cost estimates for outputting the job using one or more devices or apparatuses, the customer has the option of choosing a device or apparatus should be used to output the document (or not used), based on the customer's pricing point.

In accordance with an embodiment, a neutral page detection module and pixel count module are provided to process image data using a method as shown in FIG. 1. Additionally and/or alternatively there may be also provided a binary to contone conversion module (or vice versa) and a pixel counting module. For example, when non-neutral/color pixels are counted (e.g., in binary CMYK domain), contone data is available (the contone data is converted from binary). However, other variants are also possible. In accordance with an embodiment, a neutral pixel detection module is provided in the front end image processing elements to determine the first count. In one embodiment, the pixel counting module counts the number of color pixels (based on binary CMYK domain) to determine the second count. Accordingly, existing image paths may be easily altered to implement the disclosed method 100. For example, a neutral page detection module and/or pixel counting module may already exist in the image path.

Other embodiments include incorporating the disclosed method into a set of computer executable instructions readable by a computer and stored on a data carrier or otherwise a computer readable medium, such that the method 100 in FIG. 1 or method 200 of FIG. 2 is automated. In a possible embodiment, the methods may be incorporated into an operative set of processor executable instructions configured for execution by at least one processor. FIGS. 1 and 2 show exemplary flow charts of such computer readable instructions. For example, in some embodiments, memory or storage of an output device carrying instructions is configured such that when the executable instructions are executed by a computer or processor, they cause a computer or processor to automatically perform a method for processing image data. Such instructions may be contained in memory 306, for example. In alternative embodiments, hard-wired circuitry may be used in place of or in combination with software instructions to implement the disclosure. Thus, embodiments of this disclosure are not limited to any specific combination of hardware circuitry and software. Any type of computer program product or medium may be used for providing instructions, storing data, message packets, or other machine readable information associated with the methods 100 and 200. The computer readable medium, for example, may include non-volatile memory, such as a floppy, ROM, flash memory, disk memory, CD-ROM, and other permanent storage devices useful, for example, for transporting information, such as data and computer instructions. In any case, the medium or product should not be limiting.

In addition, it should be noted that the system/apparatus 300 may include a display or control panel user interface (UI) that allows a customer to read the billing meter. Meter reads may be used for cost-per-copy pricing, for example. Such meter reads can be obtained by accessing the local user interface on the control panel, or, alternatively, by accessing a remote user interface using an Internet or web connection. For example, a simple interface may be provided that enables a customer or supplier to manage, configure, and monitor networked printers and MFDs from a desktop or laptop using an embedded web server. The location and accessibility of the billing meters on the display/control panel interface should not be limiting. For example, a user may scroll through a list of the billing plans that are available directly on the machine, as well as the billing costs associated therewith, or on a computer. In some cases, the billing meters can also be viewed on a usage profile report. Such a report may be printed or electronic. In the case of an electronic report, for example, one may access such information via a network and an appropriate IP address associated with the device. This information may be accessed via a browser. In an embodiment, the device or system updates the usage in real time. Thus, the billing meters that are accessible via a remote location will match the billing meters of the user interface and its displayed counters.

While the principles of the disclosure have been made clear in the illustrative embodiments set forth above, it will be apparent to those skilled in the art that various modifications may be made to the structure, arrangement, proportion, elements, materials, and components used in the practice of the disclosure. For example, the system 303 may be a computer system which includes a bus or other communication mechanism for communicating information, and one or more of its processing elements may be coupled with the bus for processing information. Also, the memory 306 may comprise random access memory (RAM) or other dynamic storage devices and may also be coupled to the bus as storage for the executable instructions. Storage device 308 may include read only memory (ROM) or other static storage device coupled to the bus to store executable instructions for the processor or computer. Alternatively, another storage device, such as a magnetic disk or optical disk, may also be coupled to the bus for storing information and instructions. Such devices are not meant to be limiting.

It will be appreciated that various of the above-disclosed and other features and functions, or alternatives thereof, may be desirably combined into many other different systems/devices or applications. Various presently unforeseen or unanticipated alternatives, modifications, variations, or improvements therein may be subsequently made by those skilled in the art which are also intended to be encompassed by the following claims.

What is claimed is:

1. A processor-implemented method for processing image data using an image processing apparatus, the image processing apparatus comprising at least one processor for processing documents containing image data comprising a plurality of pixels, the method comprising the following acts implemented by the at least one processor:

receiving image data of a document comprising a plurality of pixels;

determining a billable count of color pixels in the received image data by:

determining a first count of color pixels in the image data in device independent space by applying a neutral page determination algorithm to the received image data, the determined first count comprising counting at least a number of true color pixels and fuzzy color pixels in the received image data;

converting the plurality of pixels of the image data into device dependent space;

determining a second count of color pixels for marking in the device dependent image data;

transforming the determined first and second counts of color pixels, and determining a minimum of the two transformed pixel counts, wherein the determining of the billable count of color pixels further comprises:

comparing the number of true color pixels from the applied neutral page determination algorithm to a predetermined threshold, and, if the comparison is greater, the transforming comprising applying a first transformation using the number of true color pixels therein, and using this first transformation result in the minimum calculation, and determining the minimum using the first transformation result, else, the transforming comprising applying a second transformation without using of the number of true color pixels, and using this second transformation result in the minimum calculation, and determining the minimum using the second transformation result.

2. The method according to claim 1, wherein the method further comprises:

determining a billing structure for the image data of the document based on the billable count of color pixels.

3. The method according to claim 2, wherein the determined billing structure is based on a multi-tiered threshold value, and wherein the determining the billing structure comprises selecting a billing tier at which to bill for outputting the received image data.

4. The method according to claim 1, wherein the number of true color pixels and fuzzy color pixels are normalized to account for resolution differences in the first count determined in device independent space and the second count determined in device dependent space.

5. The method according to claim 1, wherein the determined second count is a binary CMYK based count.

6. The method according to claim 1, wherein the transformation is based on empirical data obtained from an output print path of the image processing apparatus.

7. The method according to claim 1, wherein the received image data of the document is based on a hard copy original that is converted into digital image data.

8. A system for processing image data comprising at least one page using an image processing apparatus, the system comprising:

an input device for receiving a document containing image data, the image data comprising a plurality of pixels; and at least one processor comprising an input and an output associated with the image processing apparatus for processing the pixels of the image data, wherein the at least one processor is configured to: determine a billable count of color pixels in received image data by: determining a first count of color pixels in the image data in device independent space by applying a neutral page determination algorithm to the received image data, the determined first count comprising counting at least a number of true color pixels and fuzzy color pixels in the received image data; converting the plurality of pixels of the image data into device dependent space; determining a second count of color pixels for marking in the device dependent image data; transforming the determined first and second counts of color pixels, and determining a minimum of the two transformed pixel counts, wherein the determining of the billable count of color pixels further comprises the processor being configured to:

compare the number of true color pixels from the applied neutral page determination algorithm to a predetermined threshold, and, if the comparison is greater, the transforming comprising applying a first transformation using the number of true color pixels therein, and using this first transformation result in the minimum calculation, and determining the minimum using the first transformation result, else, the transforming comprising applying a second transformation without using of the number of true color pixels, and using this second transformation result in the minimum calculation, and determining the minimum using the second transformation result.

9. The system according to claim 8, further comprising a cost calculation element for calculating a billing cost for outputting the image data based on the determined billable count of color pixels.

10. The system according to claim 8, wherein the determined second count is a binary CMYK based count.

11. The system according to claim 8, wherein the input device is selected from the group consisting of: an image input terminal, a scanner, a memory device, or a storage device.

12. The system according to claim 8, further comprising an output device for outputting the image data, wherein the output device is selected from the group consisting of: an image output terminal, a display, a printing device, a copying device, a facsimile machine, a network, or a multi-function device.

13. The system according to claim 12, wherein the input device, the at least one processing element, and the output device are provided within an image processing apparatus.

14. The system according to claim 8, wherein the input device receives converted digital image data based on a hard copy original.

15. A non-transitory computer readable medium having stored computer executable instructions, wherein the computer executable instructions, when executed by a computer, direct a computer to perform a method for processing image data, the method comprising:

receiving image data of a document comprising a plurality of pixels;

determining a billable count of color pixels in the received image data by:

determining a first count of color pixels in the image data in device independent space by applying a neutral page determination algorithm to the received image data, the determined first count comprising counting at least a number of true color pixels and fuzzy color pixels in the received image data;

converting the plurality of pixels of the image data into device dependent space;

determining a second count of color pixels for marking in the device dependent image data;

transforming the determined first and second counts of color pixels, and determining a minimum of the two transformed pixel counts, wherein the determining of the billable count of color pixels further comprises:

comparing the number of true color pixels from the applied neutral page determination algorithm to a predetermined threshold, and, if the comparison is greater, the transforming comprising applying a first transformation using the number of true color pixels therein, and using this first transformation result in the minimum calculation, and determining the minimum using the first transformation result, else, the transforming comprising applying a second transformation without using of the number of true color pixels, and using this second transformation result in the minimum calculation, and determining the minimum using the second transformation result.

16. The medium according to claim 15, wherein the determined second count is a binary CMYK based count.

17. The medium according to claim 15, wherein the received image data of the document is based on a hard copy original that is converted into digital image data.

* * * * *